(12) United States Patent
Shyshkin

(10) Patent No.: US 7,346,226 B2
(45) Date of Patent: Mar. 18, 2008

(54) METHOD AND APPARATUS FOR MPEG ARTIFACTS REDUCTION

(75) Inventor: Vyacheslav Shyshkin, Toronto (CA)

(73) Assignee: Genesis Microchip Inc., Santa Clara, CA (US)

(*) Notice: Subject to any disclaimer, the term of this patent is extended or adjusted under 35 U.S.C. 154(b) by 703 days.

(21) Appl. No.: 10/964,197

(22) Filed: Oct. 12, 2004

(65) Prior Publication Data

US 2005/0129330 A1   Jun. 16, 2005

Related U.S. Application Data

(60) Provisional application No. 60/530,307, filed on Dec. 16, 2003.

(51) Int. Cl.
*G06K 9/40* (2006.01)
*G06K 9/38* (2006.01)

(52) U.S. Cl. ...................... 382/275; 382/263

(58) Field of Classification Search ............... 382/164, 382/172, 173, 218, 219, 254, 272, 260–264, 382/275, 284; 348/406.1, 606, E5.066, E5.077; 375/240.29, E7.19, E7.193, E7.241, E7.256
See application file for complete search history.

(56) References Cited

U.S. PATENT DOCUMENTS

| | | | |
|---|---|---|---|
| 4,980,764 A | | 12/1990 | Henot |
| 5,259,040 A | | 11/1993 | Hanna |
| 5,317,397 A | | 5/1994 | Odaka et al. |
| 5,539,663 A | * | 7/1996 | Agarwal ............ 348/406.1 |
| 5,786,872 A | | 7/1998 | Miyazaki et al. |
| 5,799,111 A | * | 8/1998 | Guissin ............ 382/254 |
| 5,819,035 A | * | 10/1998 | Devaney et al. ........ 709/202 |
| 6,041,145 A | * | 3/2000 | Hayashi et al. ........ 382/268 |
| 6,178,205 B1 | | 1/2001 | Cheung et al. |
| 6,236,763 B1 | | 5/2001 | Wong et al. |

(Continued)

FOREIGN PATENT DOCUMENTS

CN   1127906 A   7/1996

(Continued)

OTHER PUBLICATIONS

International Examination Report dated May 18, 2007, in corresponding Singapore application 200406810-2.

(Continued)

*Primary Examiner*—Amir Alavi
(74) *Attorney, Agent, or Firm*—Beyer Weaver LLP

(57) ABSTRACT

Disclosed herein are methods and apparatus, including computer program products, implementing and using techniques for reducing mosquito noise in an image frame of a video signal. A window of the image frame is provided. The window includes a plurality of pixel values. One of the pixel values is selected from the pixel values in the window to define a modified window of pixel value differences. A local mean (DC) value is computed based on the pixel value differences. A mosquito noise reduction value is also computed based on the pixel value differences. An artifact attenuation factor is computed as a function of a dynamic range measure of the pixel value differences. A weighted sum of the mosquito noise reduction value and the local mean value, applying the artifact attenuation factor, and the selected pixel value, is computed to generate a modified pixel value.

16 Claims, 12 Drawing Sheets

U.S. PATENT DOCUMENTS

| | | | |
|---|---|---|---|
| 6,278,736 | B1 | 8/2001 | De Haan et al. |
| 6,349,114 | B1 | 2/2002 | Mory |
| 6,359,658 | B1 * | 3/2002 | He et al. .................... 348/607 |
| 6,658,059 | B1 | 12/2003 | Iu et al. |
| 7,003,173 | B2 * | 2/2006 | Deshpande ................ 382/261 |
| 7,076,113 | B2 * | 7/2006 | Le Dinh .................... 382/261 |
| 2002/0113901 | A1 | 8/2002 | Osberger |
| 2002/0163969 | A1 | 11/2002 | Zhong et al. |
| 2002/0196362 | A1 | 12/2002 | Yang et al. |
| 2003/0072373 | A1 | 4/2003 | Sun |
| 2003/0086498 | A1 | 5/2003 | Lee et al. |
| 2003/0156646 | A1 | 8/2003 | Hsu et al. |
| 2005/0013365 | A1 | 1/2005 | Murkerjee et al. |
| 2005/0128355 | A1 * | 6/2005 | Kang et al. ................. 348/606 |
| 2005/0129330 | A1 * | 6/2005 | Shyshkin ................... 382/275 |

FOREIGN PATENT DOCUMENTS

| | | |
|---|---|---|
| EP | 0 242 935 A1 | 10/1987 |
| EP | 0 294 956 A2 | 5/1988 |
| EP | 0 376 330 A2 | 7/1990 |
| EP | 0 466 981 A1 | 7/1990 |
| EP | 0 772 365 A2 | 5/1997 |
| EP | 0772365 | 5/1997 |
| EP | 0 849 950 | 6/1998 |
| EP | 1 117 251 A1 | 7/2001 |
| EP | 1 587 328 A2 | 10/2005 |
| GB | 2 286 740 A | 8/1995 |
| GB | 2 311 183 A | 9/1997 |
| WO | 87/05770 | 9/1987 |
| WO | 94/06098 | 3/1994 |
| WO | WO 99/60779 | 11/1999 |
| WO | 00/30359 | 5/2000 |
| WO | 02/09611 A2 | 2/2002 |
| WO | 02/19721 A2 | 3/2002 |
| WO | WO 02/087210 | 10/2002 |
| WO | WO 03007618 | 1/2003 |

OTHER PUBLICATIONS

Jostschulte et al., "A Subband Based Spatio-Temporal Noise Reduction Technique for Interlaced Video Signals," pp. 438-439, International Conference on Consumer Electronics, Los Angeles, CA, Jun. 2-4, 1998.

Jostschulte et al., "Perception Adaptive Temporal TV-Noise Reduction Using Contour Preserving Prefilter Techniques," IEEE Transactions on Consumer Electronics, vol. 44, No. 3, pp. 1091-1096; 1998.

de Haan et al., "Television Noise Reduction IC," IEEE Transactions on Consumer Electronics, vol. 44, No. 1, Feb. 1998, pp. 143-154.

Ryu, et al., "Deinterlacing Using Motion Compensated Local Spectra," Proceedings of Asilomar-29, IEEE 1996, pp. 1394-1397.

Ohm et al., "Variable-Raster Multiresolution Video Processing With Motion Compensation Techniques," Proceedings IEEE 4th International Conference on Image Processing (ICIP-97), vol. 1, pp. 759-762, Oct. 1997.

Gerard de Haan, "IC For Motion Compensated De-Interlacing, Noise Reduction, and Picture Rate Conversion," IEEE Transactions on Consumer Electronics, vol. 45, Aug. 1999, pp. 617-624.

Braun et al., "Motion-Compensating Real-Time Format Converter for Video on Multimedia Displays," Proceedings IEEE 4th International Conference on Image Processing (ICIP-97), vol. 1, pp. 125-128, Oct. 1997.

Kalevo et al.,"Motion Compensated Deinterlacing," 1993 IEEE, pp. 40-41.

de Haan et al., "Real-Time 2-3 Pull-Down Elimination Applying Motion Estimation/Compensation in a Programmable Device," Consumer, vol. 44, No. 3, Aug. 1998, pp. 930-938.

Patti et al., "A New Motion-Compensated Reduced-Order Model Kalman Filter for Space-Varying Restoration of Progressive and Interlaced Video," IEEE Transactions on Image Processing, vol. 7, No. 4, Apr. 1998, pp. 543-554.

Delogne et al., "Improved Interpolation, Motion Estimation, and Compensation for Interlaced Pictures," IEEE Transactions on Image Processing, vol. 3, No. 5, Sep. 1994, pp. 482-491.

Gu et al., "IIR Digital Filters for Sampling Structure Conversion and Deinterlacing of Video Signals," ISCAS 1995, pp. 973-976.

de Haan, et al., "De-Interlacing of Video Data," IEEE Transactions on Consumer Electronics, vol. 43, No. 3, Aug. 1997, pp. 819-925.

Thomas, ",A Comparison of Motion-Compensated Interlace-to-Progressive Conversion Methods," BBC Research and Development Report, 1996.

Bellers et al., "Advanced De-Interlacing Techniques," Proceedings ProRISC/IEEEE Workshop on Circuits, Systems and Signal Processing, Mierlo, The Netherlands, Nov. 1996, pp. 7-17.

Kwon et al., "Deinterlacing Using Directional Interpolation and Motion Compensation," IEEE Transactions on Consumer Electronics, vol. 49, No. 1, Feb. 2003, pp. 198-203.

Vandendorpe et al., "Generalized Interpolators for Advanced Movement-Compensated 50HZ-60HZ Conversion of Interlaced Sequences," ICIP 1995, pp. 2237-2240.

Schu et al., "System on Silicon-IC for Motion Compensated Scan Rate Conversion, Picture-in-Picture Processing, Split Screen Applications and Display Processing," Digest of the ICCE 99 Conference, pp. 172-173, Jun. 1999.

Kalevo et al., "Deinterlacing of Video Signals Using Nonlinear Interpolation With Simple Motion Compensation," Signal Processing Laboratory, Tampere University of Technology, pp. 4.1-4.6; 1996.

Liang, "Phase-Correlation Motion Estimation," EE 392J, Final Project, pp. 1-9; 1998.

Sun, "De-Interlacing of Video Images Using a Shortest Path Technique," IEEE Transactions on Consumer Electronics, vol. 47, No. 2, May 2001, pp. 225-230.

Oh et al., "Spatio-Temporal Edge-Based Median Filtering for Deinterlacing," Proceedings of the International Conference on Consumer Electronics, 2000, Los Angeles, CA, Jun. 2000, pp. 52-53.

Kovacevic et al., "Deinterlacing by Successive Approximation," IEEE Transactions on Image Processing, vol. 6, No. 2, Feb. 1997, pp. 339-344.

International Search Report dated Jan. 12, 2006 from corresponding International Application No. EP 04 25 7855.

International Search Report dated Jan. 17, 2006 from corresponding International Application No. EP 04 25 8046.

Vella et al., "Digital Image Stabilization by Adaptive Block Motion Vectors Filtering," IEEE Transactions on Consumer Electronics, vol. 48, No. 3, Aug. 2002, XP-002284976.

Park et al., "Robust estimation of camera parameters from image sequence for video composition," Signal Processing Image Communication, Elsevier Science Publishers, Amsterdam, NL, vol. 9, No. 1, Nov. 1996, pp. 43-53, XP004071578.

Migliorati et al., Multistage motion estimation for image interpolation, Signal Processing Image Communication, Elsevier Science Publishers, Amsterdam, NL, vol. 7, No. 3, Sep. 1995, pp. 187-199, XP004047102.

Singapore Examination Report dated Mar. 23, 2007 from corresponding Singapore Application No. 200407680-8.

Choi et al., "Motion Adaptive 3D Y/C Separation Algorithm Using Motion Estimation and Motion Compensation," IEEE Transactions on Consumer Electronics, vol. 47, No. 4, Nov. 2001, pp. 770-778.

International Search Report dated Jun. 1, 2005 from European Patent Application EP 04 25 8048.

International Search Report dated Feb. 2, 2006 in corresponding Singapore Patent Application SG 200406853-2.

European Search Report dated Apr. 13, 2006 in corresponding Patent Application EP 04257854.2.

International Search Report dated Feb. 8, 2006 in corresponding Patent Application SG 200406862-3.

First Office Action dated Aug. 24, 2007 in corresponding Chinese Application No. 200410102094.X.

First Office Action dated Aug. 17, 2007 in corresponding Chinese Application No. 200410102089.9.

Examination Report dated Sep. 11, 2006 from corresponding European Patent Application No. 04257653.8.

International Search Report dated Apr. 5, 2006 from corresponding European Application No. EP 04 25 7653.

Yang et al., "Low Bit Rate Video Sequence Coding Artifact Removal," Multimedia Signal Processing, 2001 IEEE Fourth Workshop on Oct. 3-5, 2001.

Yuen et al., "A survey of hybrid MC/DPCM/DCT video coding distortions," Signal Processing, Elsevier Science Publishers B.V. Amsterdam, NL, vol. 70, No. 3, Nov. 30, 1998.

International Search Report dated May 31, 2006 from corresponding Singapore Application No. 200406810-2.

* cited by examiner

300

350

METHOD AND APPARATUS FOR MPEG ARTIFACTS REDUCTION

REFERENCE TO EARLIER-FILED APPLICATION

This application claims benefit of priority from U.S. Provisional Patent Application No. 60/530,307, filed Dec. 16, 2003, and entitled "MPEG Artifacts Reduction," which is hereby incorporated by reference.

BACKGROUND

This invention generally relates to improving video and graphics quality.

MPEG compression is a widely used algorithm for digital video signal transmission and storage. MPEG encoded and decoded streams of video can be used in various applications including cable television, satellite television, and digital video discs (DVD).

The content of a video signal generally comprises a sequence of image frames for a progressive video sequence and image fields for an interlaced video sequence. Each frame/field consists of a rectangular spatial area of pixels. When video content is encoded using MPEG, generally an 8×8 window of pixels (64 pixels) in an image frame of the video signal is processed as follows. First, a Discrete Cosine Transform (DCT) is applied to the window to generate a 2-D spatial spectrum representation of the 8×8 window. This 2-D spatial spectrum is often referred to as a Fourier image, as it is a representation of the image in the Fourier domain. The Fourier image also has 64 pixels. The pixel values in the Fourier image represent a DC component and various frequencies or AC components. The DC component is generally situated in a top left corner pixel of the Fourier image. The other 63 pixels in the Fourier image represent the AC components. After generating the Fourier image, an MPEG encoder quantization is applied so that all the 64 pixels in the Fourier image are quantized.

The MPEG-2 standard provides for intraframe compression. In a video sequence, neighboring image frames are grouped into one or more Groups of Pictures ("GOP"). In a GOP, one image frame is encoded spatially, namely the I-frame. For other frames, differences are encoded. There are two types of frames where differences are encoded: P-frame and B-frame. For a P-frame, the difference between a current frame and a modified by motion vectors I-frame is spatially encoded. For a B-frame, the difference between a current frame and a weighting sum of a modified by motion vectors I-frame and P-frame or two P-frames is spatially encoded. "Modified by motion vectors" means that the currently encoded P- (or B-) frame is split by 16×16 pixel squares, and for each square the best matched square located with some spatial offset from the reference frame is searched. The searching happens in some local area. The spatial offset (vertical and horizontal) for the best matching block is kept in the MPEG stream and called the motion vector. Each 16×16 block of P-frame has one motion vector, and the B-frame has two motion vectors. MPEG compression for an interlaced signal processes fields instead of frames.

When an image is decoded using MPEG and MPEG-2 standards, the image frame is converted back from the Fourier domain to the spatial domain. The encoding and decoding of image frames using MPEG compression causes artifacts to appear in a processed image frame. The compression ratio, i.e. bit rate used in the MPEG encoding and decoding defines the level and behavior of the artifacts. That is, the visually perceived effect of the artifacts is a function of the bit rate.

There are various types of artifacts which can appear in image frames. When low compression rates are used, for example, less than 2 Megabits per second (Mbits/sec) the most perceivable are blocking artifacts which appear in certain areas of the image frame, particularly textured areas and etched or line areas. These blocking artifacts are often visually perceived as an image or object that appears to be divided into blocks. Pixel values inside the image frame are affected, introducing artifacts which appear as abrupt transitions between neighboring windows or blocks of the image frame. These abrupt transitions are generally aligned vertically and horizontally in the image frame and make the artifact very perceivable. In edge (line) areas, blocking artifacts are caused by transitions between neighboring windows or blocks in the presence of natural edges and lines, for instance, tree branches, wires, or edges between objects. In these edge areas, additional jaggedness is visually perceived. Increasing the bit rate to an intermediate or high level, for instance, higher than 2 Mbits/sec, can effectively reduce blocking artifacts occurring at low bit rates. For low bit rates, other artifacts such as mosquito noise, and flat area blocking artifact, can also take place.

For bit rates greater than 2 Mbits/sec, the blocking artifact is less perceivable. The main artifact appearing at these and higher bit rates is mosquito noise. Mosquito noise is a high frequency pattern that appears inside a window or block of pixels particularly in a more or less flat area in the presence of a high edge in a neighborhood or any other high transition between pixel values. The mosquito noise appears as a small checkerboard mixed with delta-impulse pattern that is clearly visible in areas within the window. Mosquito noise becomes visible due to the uniform spatial distribution of quantization noise appearing in blocks which contain generally smooth areas in the presence of strong edges. The mosquito noise is perceptually visible in the smooth areas. Pure vertical and horizontal intrablock ringing is one type of the mosquito noise. Here, mosquito noise appears close to vertical and horizontal edges in the image frame. The mosquito noise caused by pure vertical or horizontal edges is less severe than that caused by diagonal structures, but is still visible as vertical and horizontal ringing of the edges.

Also, in flat or smooth areas of the image frame, a flat area (DC) blocking artifact is perceptually visible at intermediate and high bit rates (greater than about 2 Mbits/sec). The flat area blocking artifact is caused by the quantized block essentially containing only one DC component, i.e. values of the pixels of the decoded block are the same. Perceptually, the smooth flat area appears as tiled 8×8 squares having close but different values. Thus, there is a distinguishable blocking pattern with smooth areas inside the blocks and rectangular transitions between neighboring blocks. The transitions are clearly visible because the transitions are generally aligned vertically and horizontally.

In modern video processing applications, often the source of a video signal is unknown. The video signal may be digital or analog, and it could be transmitted from a DVD player, cable television source, satellite, or a montage of images from different sources. For instance, the video signal may be a combination from several analog and digital sources. Thus, any technique for artifacts reduction needs to perform effectively independent of any knowledge about the source of the video signal, including any knowledge about window or block boundaries in an image frame or video signal. Such knowledge might include information about edges, texture information and other information. If such knowledge was required, MPEG artifacts reduction techniques would be unnecessarily complex and hardware and time consuming.

Video sequences can also be affected by channel additive Gaussian Noise independent from MPEG artifacts.

Therefore, what is needed is a technique for reducing artifacts occurring at intermediate and higher compression rates in the context of MPEG compression that is effective without knowledge about block boundaries or other information as to the content of the image frames in the video signal with or without the presence of Gaussian Noise.

SUMMARY

In one aspect, the invention provides methods and apparatus, including computer program products, implementing and using techniques for reducing mosquito noise in an image frame of a video signal. A window of the image frame is provided. The window includes a plurality of pixel values. One of the pixel values is selected from the pixel values in the window to define a modified window of pixel value differences. A local mean (DC) value is computed based on the pixel value differences. A mosquito noise reduction value is also computed based on the pixel value differences. An artifact attenuation factor is computed as a function of a dynamic range measure of the pixel value differences. A weighted sum of the mosquito noise reduction value and the local mean value, applying the artifact attenuation factor, and the selected pixel value, is computed to generate a modified pixel value.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

Like reference symbols in the various drawings indicate like elements.

DETAILED DESCRIPTION

Figure 1:
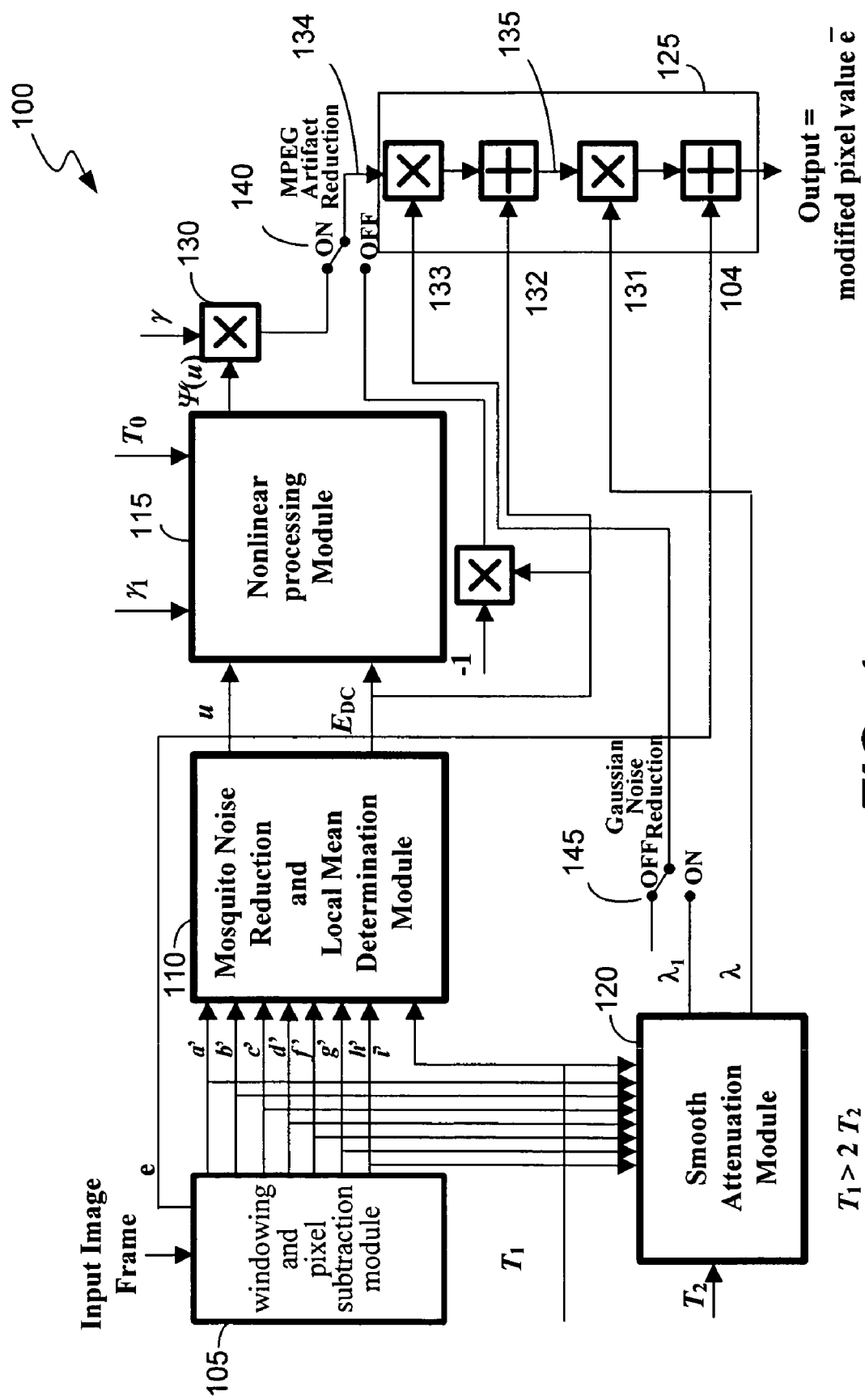
FIG. 1 shows a block diagram of an apparatus 100 for modifying a pixel value in an image frame, according to one embodiment of the present invention.

Embodiments of the present invention provide methods, apparatus, including computer program products, for modifying pixel values in an image frame of a video signal to reduce artifacts in the image frame. The methods and apparatus described herein are generally performed in the context of MPEG compression in which intermediate and high bit rates are used, generally above 2 Mbits/sec. These techniques are particularly well suited for removing mosquito noise, including pure vertical and horizontal intrablock ringing, and flat area (DC) blocking artifacts.

Embodiments of the invention provide methods and apparatus, including computer program products, implementing and using techniques for modifying pixel values of an image frame of a video signal to reduce artifacts in the image frame. According to some embodiments, an input image frame is received and processed pixel by pixel by one or more of several modules to reduce the above-described artifacts in the image frame. The modules cooperate to correct pixel values of the image frame so that the artifacts are reduced while preserving the natural details of the image frame as much as possible.

Embodiments of methods and apparatus disclosed herein process, pixel by pixel, a square sliding window as a processing aperture wherein the modifying pixel is generally a central pixel of the window. This window includes a plurality of pixel values. For a hardware implementation, linestores are cost consuming; therefore, the size of the sliding window is preferably small, e.g. 3×3. Generally, a n×n window is used, where n is a small odd value. The goal is to modify the pixel value located at the center of the window to reduce artifacts. As an initial step, the central pixel value is subtracted from the pixel values in the window to define a modified window of pixel value differences. The central pixel difference is zero.

A mosquito noise reduction module is provided to identify the mosquito noise component of a pixel. As will be shown below, the mosquito noise reduction processing is based on knowledge that mosquito noise has high frequency patterns in vertical and horizontal directions, and assumes that its dynamic range is limited to the value defined by a threshold. The mosquito noise reduction module performs a mosquito noise reduction operation on the pixel value differences in the modified window to generate two signals. First is a mosquito noise reduction value. Second is a local DC value based on the sliding window aperture. These two values are provided to a nonlinear processing module.

At the nonlinear processing module, a nonlinear function is applied to the difference between the mosquito noise reduction value and the local DC value. In this way, the nonlinear processing module reduces residual noise, pure vertical and horizontal ringing, DC blocking artifacts, and residual mosquito noise remaining in the pixel after processing by the mosquito noise reduction module. The nonlinear processing module has an adaptive threshold and operates to essentially force the value computed by the mosquito noise reduction module towards a local DC value, using techniques explained below. The nonlinear processing module effectively reduces pure vertical and horizontal ringing and DC blocking artifacts without introducing much blur into the image.

The output value of the nonlinear processing module is multiplied by a static blurriness parameter γ to control the overall blurriness of the image details. The product is multiplied by a Gaussian Noise attenuation factor generated by a smooth attenuation module, described below, and controls the Gaussian Noise reduction strength. This product is added back to the local DC value, since the local DC value was subtracted in the nonlinear processing module. The result is multiplied by an MPEG artifact attenuation factor, also generated by the smooth attenuation module, and controls the MPEG artifact reduction strength. The result of the multiplication is added to the aperture window central pixel input value, since the central pixel value was subtracted from the pixel values of the sliding window. This value is the output of the MPEG artifact reduction method and apparatus, according to some embodiments of the present invention.

The smooth attenuation module is provided to generate the MPEG artifact attenuation factor and Gaussian Noise attenuation factor based on MPEG artifact and Gaussian Noise reducing dynamic ranges. These dynamic ranges are defined by an MPEG artifact threshold and a Gaussian Noise threshold. The attenuation factors have three working zones: maximum value, zero and smooth transition between maximum and zero. The absence of the smooth transition zone can provide additional flickering. The flickering happens because values of pixels may change from frame-to-frame from slightly below the threshold to slightly above it, and the hard switch from zero to maximum takes place. Small changes up and down cause big changes up and down. The smooth attenuation module outputs attenuation factors having these zones, and additional flickering does not take place.

Embodiments of the methods and apparatus disclosed herein provide for a spatial method, which is generally practiced in a two-dimensional area or window representing part of an image frame in a video signal. This frame is generally processed on a pixel-by-pixel basis.

Embodiments of the methods and apparatus described herein can be implemented in various combinations of software and hardware. In one embodiment, the methods and apparatus are implemented in a video controller for use with a television or other display device. The methods and apparatus described herein are particularly well suited for processing video signals from any of various sources, including analog sources, digital sources, and a montage of analog and digital signals. For instance, the methods and apparatus are applicable to TV sets, DVD players, cable television systems, and satellite transmission of television signals. Artifacts associated with intermediate and high bit rates encoding, including mosquito noise and flat area blocking artifacts, are reduced regardless of the source of the video signal. No knowledge of window or block boundaries used in MPEG compression is required. Thus, embodiments of the methods and apparatus are computationally less complex, less time consuming, and less hardware consuming than conventional techniques requiring knowledge of block boundaries.

FIG. 1 shows an apparatus 100 for modifying a pixel value in an image frame of an input video signal to reduce artifacts in the image frame. In FIG. 1, the apparatus 100 includes a windowing and pixel subtraction module 105 which receives an input image frame. The apparatus 100 further includes a mosquito noise reduction and local mean determination module 110 which receives pixel values a'–i' from windowing and pixel subtraction module 105. In addition, apparatus 100 includes nonlinear processing module 115 which receives information from mosquito noise reduction and local mean determination module 110 and outputs a value to a multiplier module 130 to be multiplied by a static blurriness parameter γ. The apparatus 100 also includes smooth attenuation module 120, which receives pixel values a'–i' from module 105 and outputs MPEG artifact and Gaussian Noise attenuation factors λ and $λ_1$ to an output module 125. Output module 125, which receives output values from module 130 and module 120 and the local DC value from module 110 provides a modified pixel value $\bar{e}$ as output. As shown in FIG. 1, windowing and pixel subtraction module 105 outputs central pixel value "e" to output module 125 for modification of that pixel value "e." Parameters $T_2$, $T_1$, $T_0$, and γ are control parameters for the method 200 and apparatus 100, and are discussed below.

Figure 2:
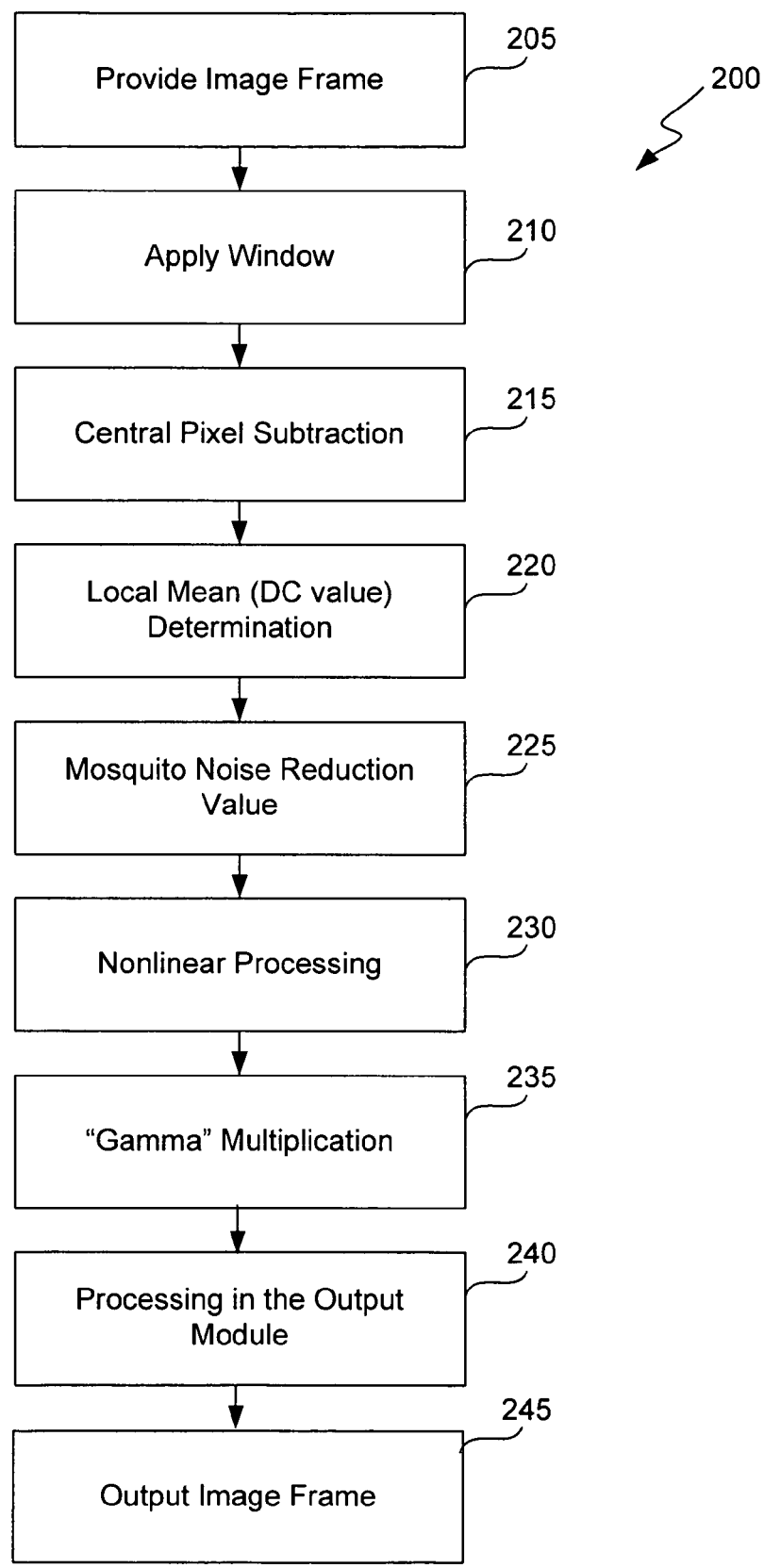
FIG. 2 shows a flow diagram of a method 200 for modifying a pixel value in an image frame, performed in accordance with one embodiment of the present invention.

FIG. 2 provides a method 200 of the operation of the apparatus 100 for modifying a pixel value in an image frame to reduce artifacts in the image frame. In step 205, the input image frame is provided to windowing and pixel subtraction module 105. In this embodiment, windowing and pixel subtraction module 105 provides two functions: (1) a sliding windowing operation, and (2) a pixel subtraction operation. Those skilled in the art will appreciate, in another embodiment, there is a separate module for each function; that is, the windowing operation is provided by a windowing module, and the pixel subtraction operation is performed by a separate pixel subtraction module.

In step 210 of FIG. 2, windowing module 105 provides a window 300 of the input image frame. In one example, window 300 is a 3×3 sliding window described below with reference to FIG. 3A. The window includes a plurality of pixel values from a portion of the input image frame. In step 215, the pixel subtraction module in module 105 subtracts a central pixel value in the window from the other pixel values in the window to define a modified window of pixel value differences a'–i', as described below with reference to FIG. 3B.

In FIG. 1, mosquito noise reduction and local mean determination module 110 provides two functions: (1) a mosquito noise reduction operation, and (2) a local mean determination operation. Those skilled in the art will appreciate, in another embodiment, the local mean determination module is a submodule of mosquito noise reduction module. In step 220 of FIG. 2, the local mean determination module determines a local mean value "$E_{DC}$" based on the input pixel value differences a'–i'. In step 225, the mosquito noise reduction module 110 performs a mosquito reduction operation on the pixel value differences a'–i' in the modified window of FIG. 3B to generate a mosquito noise reduction value "u." This mosquito noise reduction operation is described below with respect to FIGS. 4 and 5.

In step 230 of FIG. 2, nonlinear processing module 115 determines the difference between local mean value "$E_{DC}$" and mosquito noise reduction value "u" and generates a nonlinear function based on this difference to reduce the DC blocking artifact, and pure vertical and horizontal ringing. In step 235 of FIG. 2, the value output from nonlinear processing module 115 is multiplied in multiplier block 130 by a blurriness parameter γ which controls overall blurriness. The output result is received by module 125.

In step 240, the processing in the output module 125 takes place. At the output module 125, the input value 134 is multiplied by Gaussian Noise attenuation factor $\lambda_1$ received from smooth attenuation module 120. Then the local mean received from module 110 is added to the product. The result is multiplied by MPEG artifact attenuation factor λ, also received from the smooth attenuation module 120. The obtained product is added to the central pixel value of the sliding window received from the module 105 and outputs a modified pixel value $\bar{e}$. The attenuation factors λ and $\lambda_1$ provided to the output module 125 control the strength of the MPEG artifact and Gaussian Noise reduction done by previous modules to the pixel value e. In step 245, the modified pixel value $\bar{e}$ is allocated in the output image frame.

Figure 3A:
FIG. 3A shows an illustration of an aperture window 300 of pixel values in an image frame, for a 3×3 case, according to one embodiment of the present invention.

FIG. 3A shows an illustration of a window 300 of pixel values a–i in the input image frame provided to windowing and pixel subtraction module 105 of FIG. 1. In this particular embodiment, window 300 is a 3×3 window of pixels from the input image frame. Those skilled in the art will appreciate that other window sizes of n×n, where n is preferably a small odd number, may be used in other embodiments. In this embodiment, a central pixel "e" of the 3×3 window is selected as the pixel for processing. The sliding window 300 is moved along the entire image frame in both horizontal and vertical directions, i.e. pixel by pixel in each line, line by line, to process all of the pixels in the image frame. The window 300 enables apparatus 100 to provide a modification of the central pixel value "e" based on the 9 pixel values a–i in the window 300.

Figure 3B:
FIG. 3B shows an illustration of a modified aperture window 350 of pixel value differences, for a 3×3 case, according to one embodiment of the present invention.

FIG. 3B shows a modified window 350 of pixel value differences a'–i' after the pixel subtraction operation 215 is performed on window 300 by module 105 in FIG. 1. In this embodiment, the central pixel "e" is subtracted from each pixel a–i in window 300 to define pixel value differences a'–i' as shown in FIG. 3B. In particular, the differences between the pixel values a–i of the window 300 and the central coefficient e are represented as:

e'=0; a'=a−e; b'=b−e; c'=c−e; d'=d−e; f'=f−e;
g'=g−e; h'=h−e; i'−i−.

Figure 4:
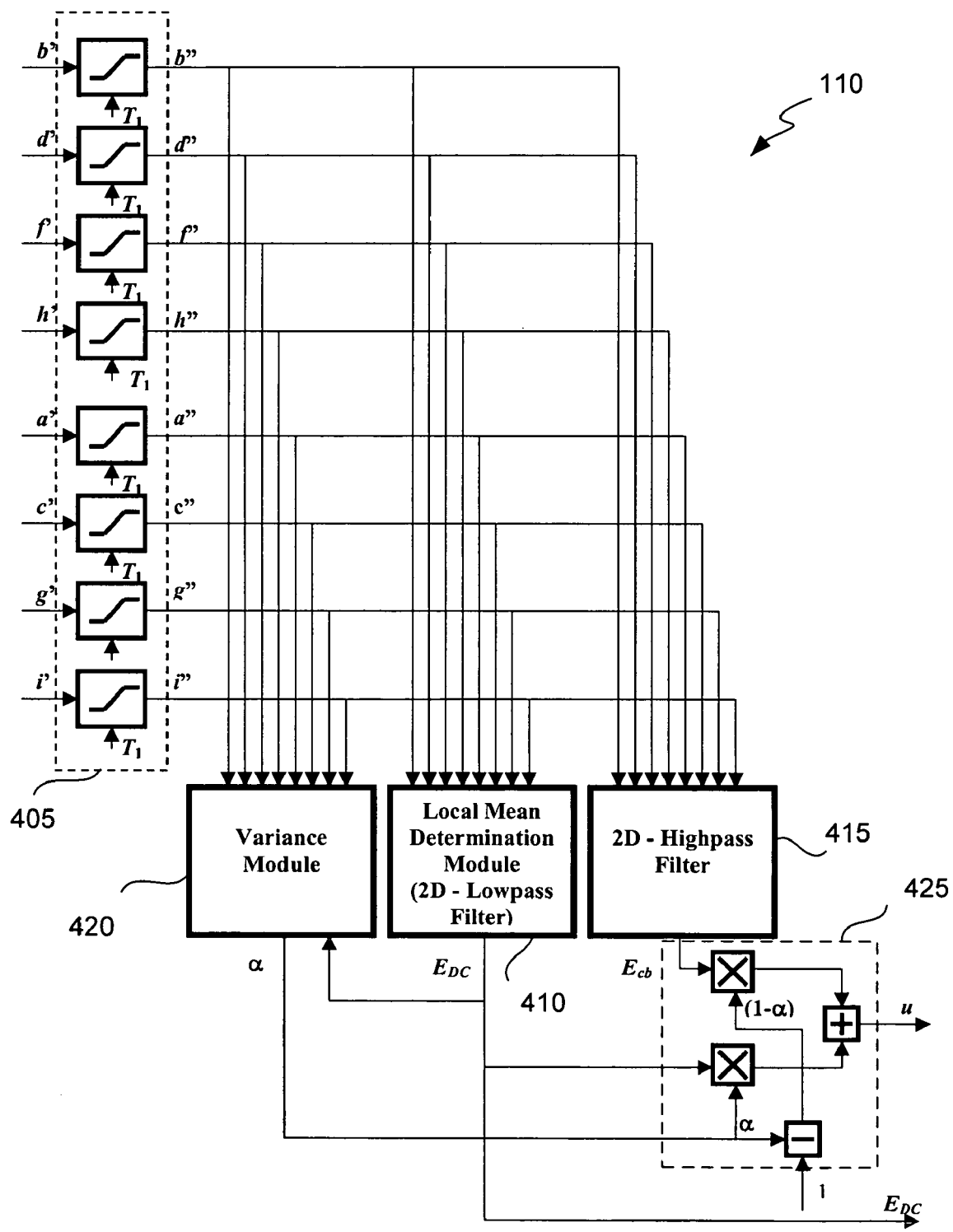
FIG. 4 shows a block diagram of a mosquito noise reduction module 110, for a 3×3 case, according to one embodiment of the present invention.
Figure 5:
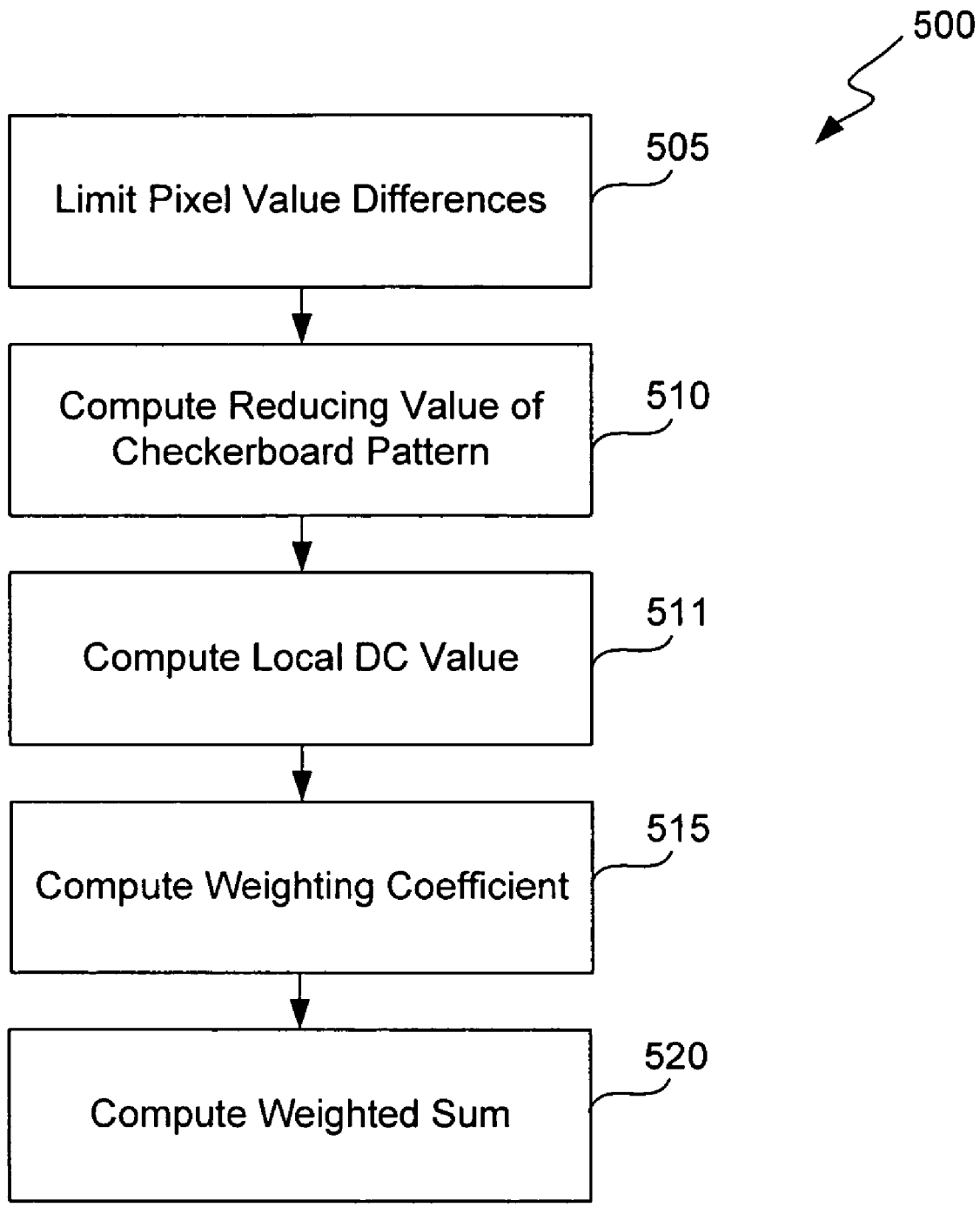
FIG. 5 shows a flow diagram of a method 500 for performing a mosquito noise reduction operation, performed in accordance with one embodiment of the present invention.

FIG. 4 shows a block diagram of mosquito noise reduction and local mean determination module 110 constructed according to one embodiment of the present invention. The module 110 includes limiting modules 405, local mean determination module 410, 2D-highpass filter 415, and a variance module 420 for computing a weighting coefficient α. FIG. 5 provides a flow diagram of a method 500 for performing a mosquito noise reduction operation, described with reference to FIG. 4. The mosquito noise reduction and local mean determination module 110 decreases intrablock ringing while preserving as much as possible the natural details of the input image frame. The mosquito noise reduction operation is based on knowledge that mosquito noise is a high frequency process both in vertical and horizontal directions, appears as a mixture of checkerboard and delta-impulse patterns, and the assumption that the mosquito noise dynamic range is located in the range of e−$T_1$ to e+$T_1$.

In FIG. 4, pixel value differences a'–i' of modified window 350 are provided to the limiting modules 405.

In step 505 of FIG. 5, the limiting modules 405 limit the pixel value differences by a threshold −$T_1$ from the bottom and +$T_1$ from the top to define limited pixel value differences. This threshold $T_1$ defines the working dynamic range for mosquito noise reduction. The limiting modules output a group of the limited pixel value differences, b", d", f", h", a", c", g", and i". In particular, a mathematical representation of the derivation of these limited pixel value differences is as follows:

$$a'' = \text{Lim}(a', T_1), \ b'' = \text{Lim}(b', T_1),$$
$$c'' = \text{Lim}(c', T_1), \ d'' = \text{Lim}(d', T_1),$$
$$f'' = \text{Lim}(f', T_1), \ g'' = \text{Lim}(g', T_1),$$
$$h'' = \text{Lim}(h', T_1), \ i'' = \text{Lim}(i', T_1),$$

where $$\text{Lim}(x, T_1) = \begin{cases} x, & |x| \leq T_1 \\ \text{sign}(x)T_1, & |x| > T_1 \end{cases}.$$

In step 510, the 2D-highpass filter 415 computes a reducing value of the checkerboard pattern $E_{cb}$. In step 511, local mean determination module 410 computes the local DC value $E_{DC}$.

In step 515 of FIG. 5, variance module 420 of FIG. 4 computes a weighting coefficient α as a function of a variance of the limited pixel value differences a"–i". In step 520, the weighting coefficient α is provided to a summing module 425, along with the reducing value of the checkerboard pattern $E_{cb}$ and local DC value $E_{DC}$ to compute a weighted sum to generate a mosquito noise reduction value "u."

$$u = \alpha E_{cb} + (1-\alpha) E_{DC},$$

The value of α generated by variance module 420 desirably satisfies the condition $0 \leq \alpha \leq 1$ and depends on the closeness of the pixels surrounding the center pixel e to each other. In particular, α is determined by variance module 420 according to the following nonlinear function:

$$\alpha = \exp\left(-\beta_1 \frac{V}{|E_0|}\right), \text{ where } E_0 = 0.5 \cdot (E_1 + E_2)$$

"V" is an estimation of the expectation of all surrounding pixels, $$V = |E_0 - a'| + |E_0 - b'| + |E_0 - c'| + |E_0 - d'| + |E_0 - f'| + |E_0 - g'| + |E_0 - h'| + |E_0 - i'|$$

$\beta_1$ is a predetermined constant positive value, obtained on the basis of subjective experimentation. In one example, to decrease the mosquito noise value significantly, while preserving natural image details as much as possible, $\beta_1$=5 was chosen. Decreasing $\beta_1$, it is possible to reduce artifacts with more blurring of natural details of the image.

In one example, local mean determination module 410 includes a two-dimensional lowpass filter for local mean determination, for a 3×3 window obtained from the one-dimensional filter:

| 1/4 | 1/2 | 1/4 |
|---|---|---| having the following impulse response:

| 1/16 | 1/8 | 1/16 |
|---|---|---|
| 1/8 | 1/4 | 1/8 |
| 1/16 | 1/8 | 1/16 |

Therefore, the local DC value $E_{DC}$ is as follows.

$$E_{DC} = \frac{1}{2} \cdot E_1 + \frac{1}{4} \cdot E_2,$$

where $E_1 = \text{Avr}(b'',d'',f'',h'')$, and $E_2 = \text{Avr}(a'',c'',g'',i'')$, and where Avr( ) means average.

A two-dimensional highpass filter for the reducing value of the checkerboard pattern $E_{cb}$ for a 3×3 window obtained from the one-dimensional filter:

| −1/4 | 1/2 | −1/4 |
|---|---|---| has the following impulse response:

| −1/16 | 1/8 | −1/16 |
|---|---|---|
| 1/8 | 1/4 | 1/8 |
| −1/16 | 1/8 | −1/16 |

Therefore, the local DC value $E_{cb}$ is as follows:

$$E_{cb} = \frac{1}{2} \cdot E_1 - \frac{1}{4} \cdot E_2,$$

where $E_1 = \text{Avr}(b'',d'',f'',h'')$, and $E_2 = \text{Avr}(a'',c'',g'',i'')$, and where Avr( ) means average.

The $E_{DC}$ value is output to nonlinear processing module 115 along with the mosquito noise reduction value u, as shown in FIG. 1. The nonlinear processing module 115 of FIGS. 1 and 6A, 6B reduces any residual amounts of mosquito noise remaining after the mosquito noise reduction operation is performed, as well as DC blocking artifacts and pure vertical or horizontal ringing. As will be shown below, the nonlinear processing module 115 essentially forces the modified pixel value towards the local DC value $E_{DC}$ to reduce remaining high frequency components associated with mosquito noise, DC blocking artifacts and pure vertical or horizontal ringing.

Figure 6A:
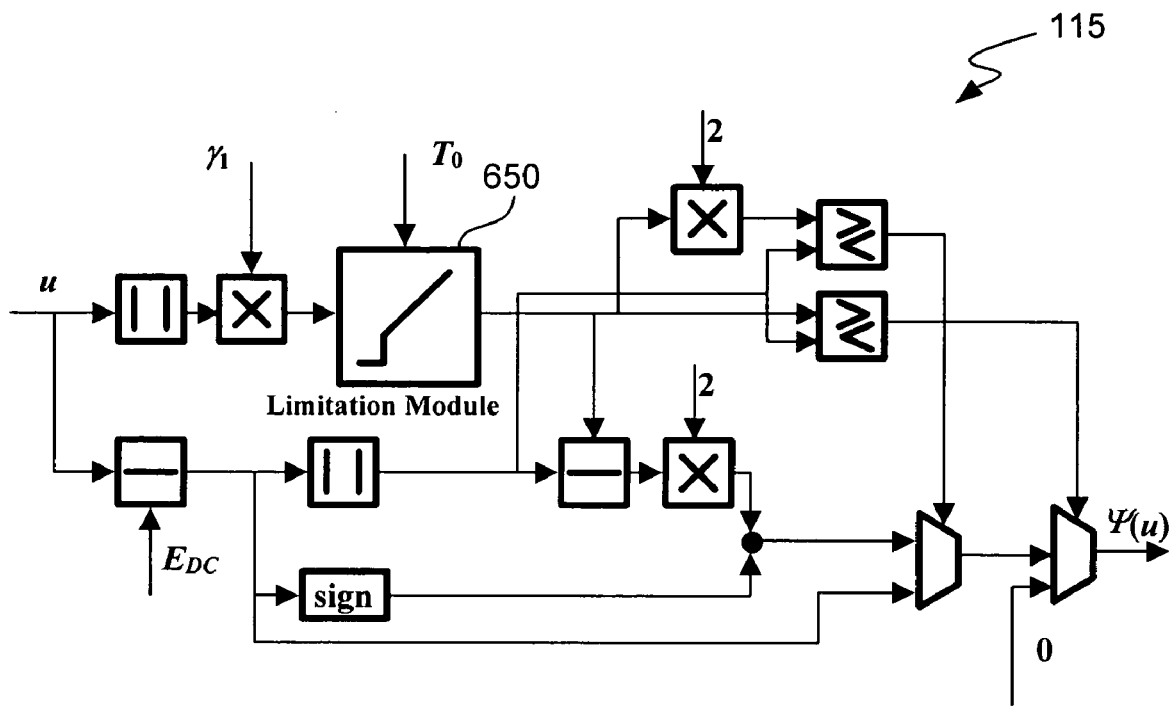
FIG. 6A shows a nonlinear processing module 115 for generating a nonlinear function, according to one embodiment of the present invention.
Figure 6B:
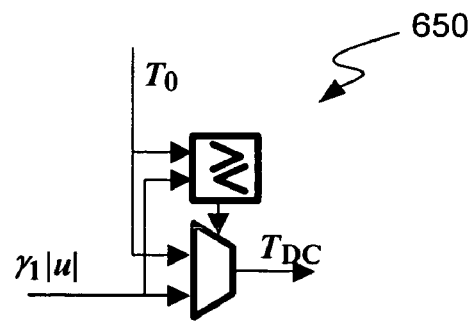
FIG. 6B shows a limitation module 650 of the nonlinear processing module, according to one embodiment of the present invention.
Figure 6C:
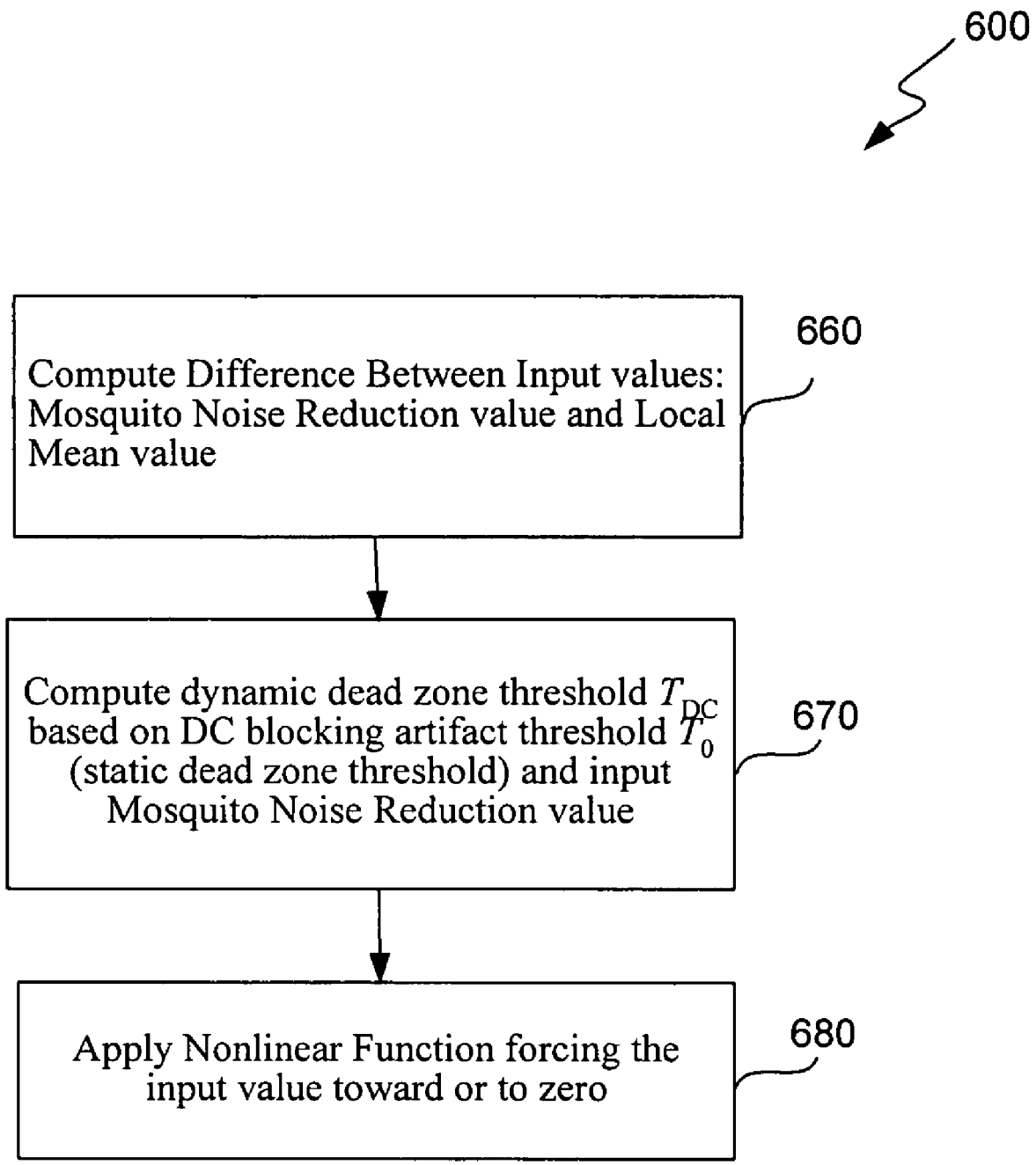
FIG. 6C shows a flow diagram of a method 600 for performing a nonlinear processing operation, according to one embodiment of the present invention.

FIG. 6A shows nonlinear processing module 115 for generating a nonlinear function $\Psi(\Delta)$ of the difference between the mosquito noise reduction value and local DC value, $\Delta = u - E_{DC}$, according to one embodiment of the present invention. FIG. 6B shows a limitation module 650 of nonlinear processing module 115, according to one embodiment of the present invention. FIG. 6C provides a flow diagram of a method 600 for performing a nonlinear processing operation, described with reference to FIG. 6A.

In step 660 of FIG. 6C, the difference is computed between the mosquito noise reduction value and local DC value, $\Delta = u - E_{DC}$. In step 670, a dynamic dead zone threshold $T_{DC}$ is computed based on: (1) a DC blocking artifact threshold, $T_0$, also referred to as a static dead zone threshold, and (2) the input mosquito noise reduction value. In step 680, a nonlinear function $\Psi(\Delta)$ is applied, forcing the input value to or toward zero.

Figure 7:
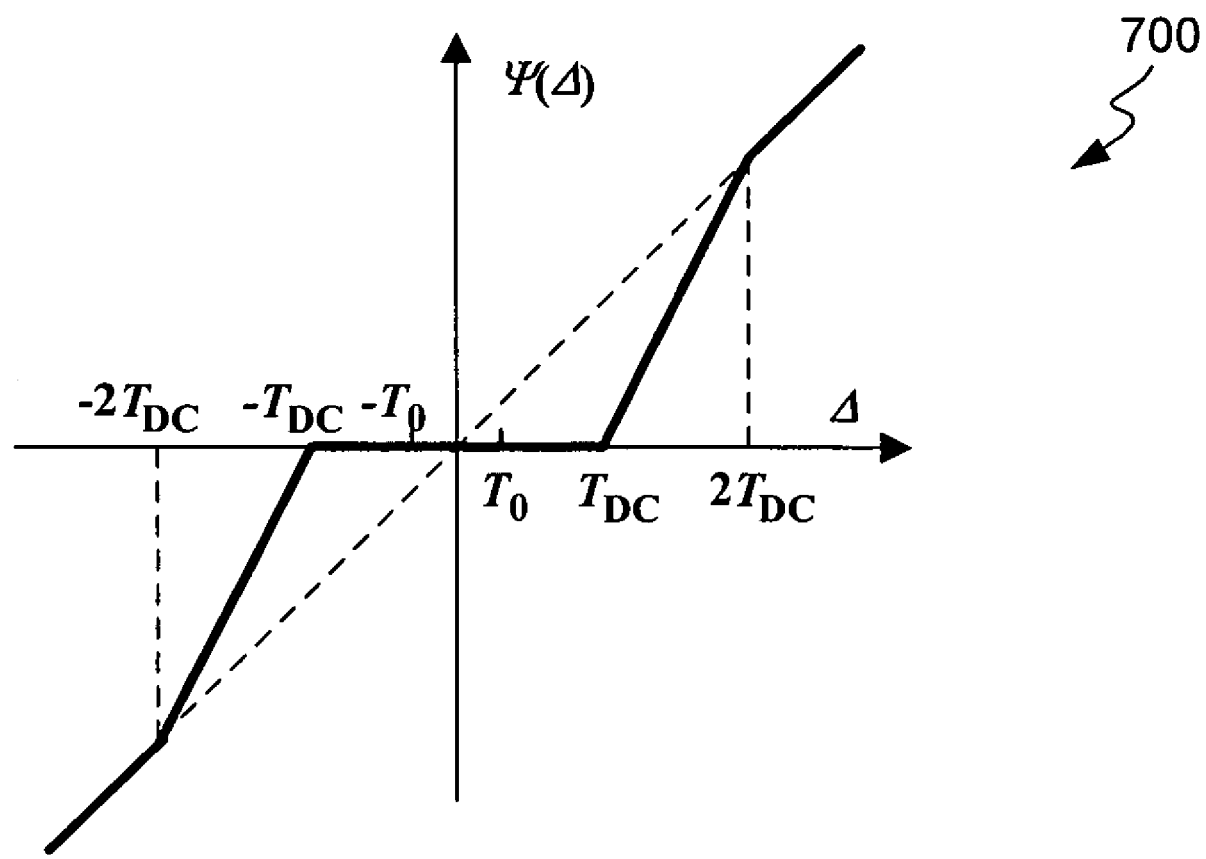
FIG. 7 shows a graphical illustration of a nonlinear function 700, according to one embodiment of the present invention.

A graphical illustration of the exemplary nonlinear function $\Psi(\Delta)$ 700 applied by nonlinear processing module 115 is shown in FIG. 7. A mathematical representation of the nonlinear function $\Psi(\Delta)$ 700 is as follows:

$$\Psi(\Delta) = \begin{cases} 0, & |\Delta| \leq T_{DC} \\ 2\text{sign}(\Delta)(|\Delta| - T_{DC}) & T_{DC} \leq |\Delta| \leq 2T_{DC} \\ \Delta, & |\Delta| \geq 2T_{DC} \end{cases},$$

$$T_{DC} = \begin{cases} \gamma_1|u|, & \gamma_1|u| > T_0 \\ T_0, & \gamma_1|u| \leq T_0 \end{cases}$$

The nonlinear function above avoids hard thresholding at $T_{DC}$, as shown in FIG. 7. Thresholding can cause flickering. The nonlinear function has a linear transition between $T_{DC}$ and $2T_{DC}$ instead of a hard switch, helping to reduce any such flickering.

In the preceding nonlinear function $\Psi(\Delta)$, the control parameter $T_0$ is a predetermined threshold, defining a static dead zone of the nonlinear function. Subjective experiments show that optimal values for $T_0 \approx 2, \ldots, 3$. As shown in FIG. 6B, the value of the threshold $T_{DC}$ is determined based on the output of the mosquito noise reduction block $\gamma_1|u|$. The parameter $\gamma_1$ is a weighting coefficient preferably satisfying the condition $0 \leq \gamma_1 \leq 1$, which provides a tradeoff between image smoothness versus reduction of MPEG artifacts in the image. $\gamma_1$ defines the strength of the MPEG artifact adaptive reduction feature, i.e., controls the adaptive threshold $T_{DC}$. When the $\gamma_1|u|$ value is smaller than $T_0$, $T_{DC}$ becomes equal to $T_0$. This modification adds an additional filtration property, efficiently decreasing DC blocking artifacts and pure vertical and horizontal ringing without introducing any significant blurring to the image. In one example, the value of the parameter $\gamma_1$ that provides satisfactory results is $\gamma_1 \approx 0.5$, based on subjective testing.

Returning to FIG. 1, at multiplier block 130, the result of the nonlinear function $\Psi(\Delta)$ that is the output of nonlinear processing module 115 is multiplied by parameter $\gamma$. $\gamma$ is a weighting coefficient which preferably satisfies the condition $0 \leq \gamma \leq 1$ and defines the strength of the MPEG artifact static reduction feature, i.e. portion of the local DC value blended with the mosquito noise reduction value. In fact, $\gamma$ is a blurriness parameter that controls a static blurriness property of the whole frame from a minimum to a maximum defined by the local DC value. For instance, when $\gamma$ is 1.0, an artifacts reduction value 135 of output module 125 is nonlinear function $\Psi(\Delta)$. When $\gamma$ is 0, the artifacts reduction value 135 of output module 125 is the local DC value $E_{DC}$. Those skilled in the art will appreciate, that when $\gamma$ is zero or close to zero, small details in the image frame are blurred because they are made equal to local DC value. In one example, the values of the control parameter $\gamma$ that provide satisfactory results are $\gamma = 0.8, \ldots, 1$, based on subjective testing.

Mosquito noise reduction processing is based on the assumption that its dynamic range is limited to the value defined by the threshold $T_1$. A dynamic range measure M is a function of all absolute values of pixel differences $a'-i'$ inside the sliding window. M is a nonlinear function $F_{DR}(\ )$ of absolute values of differences that takes into account the influence of the particular difference a'-i' to the dynamic range measure. For a 3×3 window, M can be represented as $$M = F_{DR}(|a'|, |b'|, |c'|, |d'|, |f'|, |g'|, |h'|, |i'|),$$

Figure 8A:
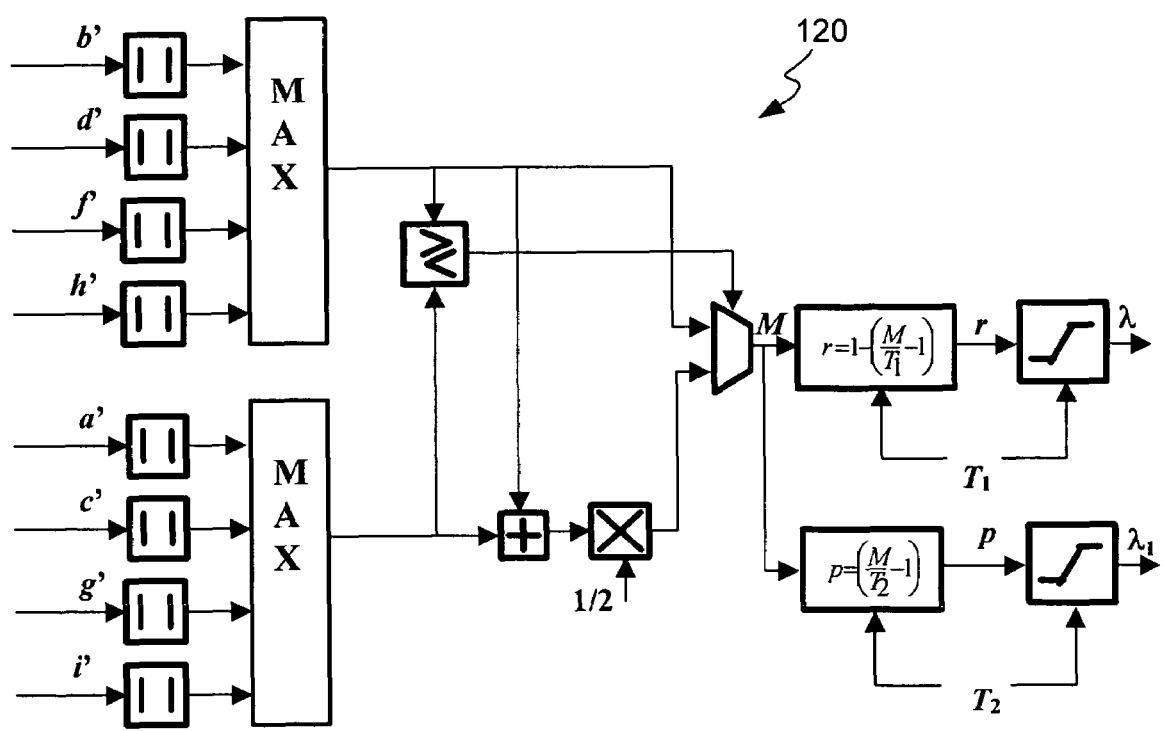
FIG. 8A shows a smooth attenuation module 120, according to one embodiment of the present invention.
Figure 8B:
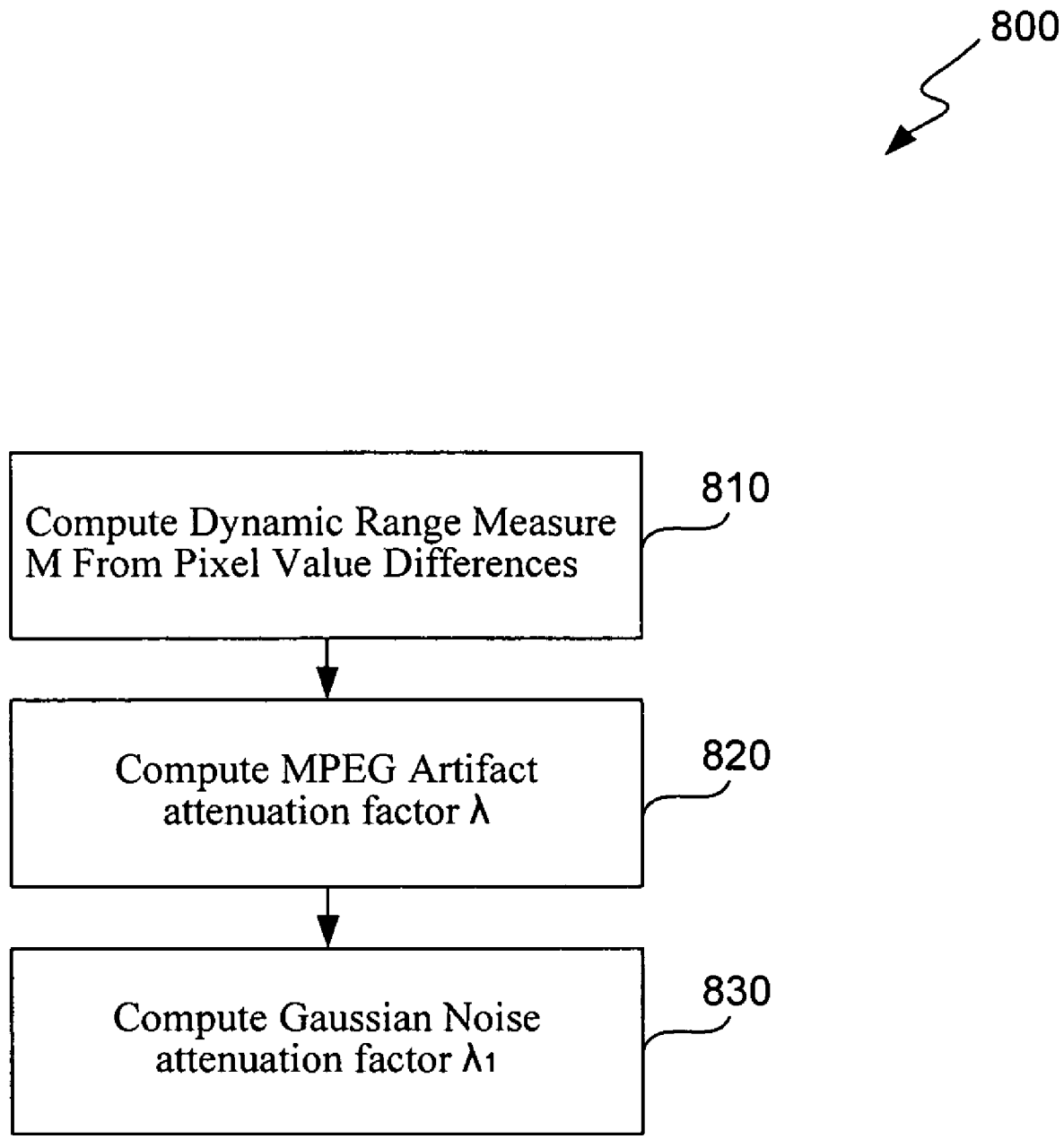
FIG. 8B shows a flow diagram of a method 800 for performing a smooth attenuation operation, performed in accordance with one embodiment of the present invention.

When the dynamic range measure is less than or equal to the threshold, it has a unity value. When the dynamic range measure of the sliding window exceeds the threshold, the output modified pixel value has to be reduced as follows:

$$\bar{e} = e + \lambda u',$$

where $\lambda$ is an MPEG artifact attenuation factor. When the output modified pixel value is reduced to zero immediately after the threshold is exceeded, the hard switch case occurs. It is possible that from frame to frame, the pixel values at the same spatial location change from slightly smaller than the threshold to slightly larger than it. Therefore, for the hard switch case, the values of the same location output pixels in the neighboring frames will have quite different values. More over slightly smaller and then larger than the threshold from frame to frame may have a repetitive pattern. Therefore, some level of flickering can occur. To avoid this phenomenon, a smooth attenuation operation is performed. When M is below or equal to the threshold $T_1$, the MPEG artifact attenuation factor is 1. As soon as M exceeds the threshold, the value of $\lambda$ starts to decrease linearly. When M reach the value $T_1 + T_1/K$, $\lambda$ is equal zero for all greater values. K is a steepness coefficient of the linear smooth transition FIG. 8A shows a block diagram of smooth attenuation module 120 for a 3×3 sliding window that performs a smooth attenuation operation 800. FIG. 8B shows a flow diagram of a method 800 for performing the smooth attenuation operation.

In step 810 of FIG. 8B, the dynamic range measure M is calculated from the pixel value differences, as explained above. The nonlinear function $F_{DR}(\ )$ takes into account the amount of the influence of a particular pixel difference to the output value based on the spatial location closeness to the central pixel, and is represented as:

$$M = \begin{cases} M_1, & M_1 \geq M_2 \\ M_1 + 0.5(M_2 - M_1), & M_1 < M_2 \end{cases},$$

$$M_1 = \max(|b'|, |d'|, |f'|, |h'|),$$

$$M_2 = \max(|a'|, |c'|, |g'|, |i'|).$$

The corner pixel differences a',c',g',i' have twice less influence and contribution than "cross" pixel differences b',d',f',h' to the output value.

In step 820, the smoothing coefficient value $\lambda$ is based on M and $T_1$ and calculated as follows:

$$\lambda = \begin{cases} 1, & r \geq 1 \\ r, & 0 < r < 1, \text{ where } r = 1 - K\left(\frac{M}{T_1} - 1\right). \\ 0, & r \leq 0 \end{cases}$$

FIG. 8 shows the case for K=1 that, based on the subjective experimentation, provides satisfactory results. The output value of the MPEG artifact attenuation factor $\lambda$ is applied to limit application of the nonlinear function to the selected pixel value e.

Figure 9A:
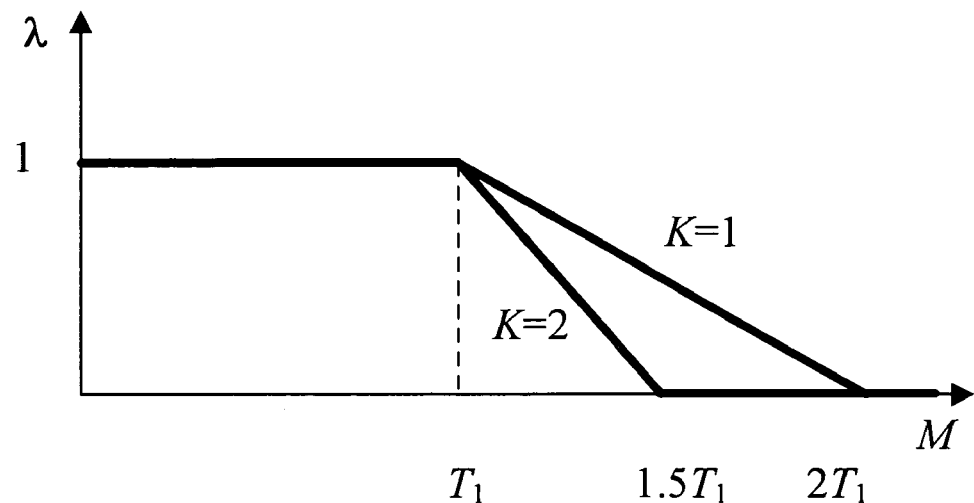
FIG. 9A shows a graphical illustration of an MPEG artifact attenuation factor $\lambda$, according to one embodiment of the present invention.

FIG. 9A shows a graphical illustration of the smoothing coefficient $\lambda$ as a function of M for various values of $T_1$ and K=1 and K=2.

In step 830 of FIG. 8B, the smooth attenuation module 120 also computes and outputs a Gaussian Noise attenuation factor $\lambda_1$ that is one of the inputs to the output module 125. When Gaussian Noise attenuation is disabled, by switch 145 in FIG. 1, the value of $\lambda_1$ has to be equal to unity, and the residual value inside the output module 125 is not modified as will be described below. When the value of $\lambda_1$ equals 0, the residual value inside the output module 125 is forced to the local DC value. The zone where $\lambda_1$ equals 0 is defined by the dynamic range measure M and the threshold $T_2$ when $M \leq T_2$. In a similar manner to MPEG artifact attenuation factor $\lambda$, to avoid the hard switch between cases when $M \leq T_2$ and $M > T_2$, the smooth attenuation is done by applying a linear transition zone for $T_2 \leq M \leq 2T_2$. Thus the value of $\lambda_1$ is determined as $$\lambda_1 = \begin{cases} 1, & p \geq 1 \\ p, & 0 < p < 1, \quad p = \left(\frac{M}{T_2} - 1\right). \\ 0, & p \leq 0 \end{cases}$$

Figure 9B:
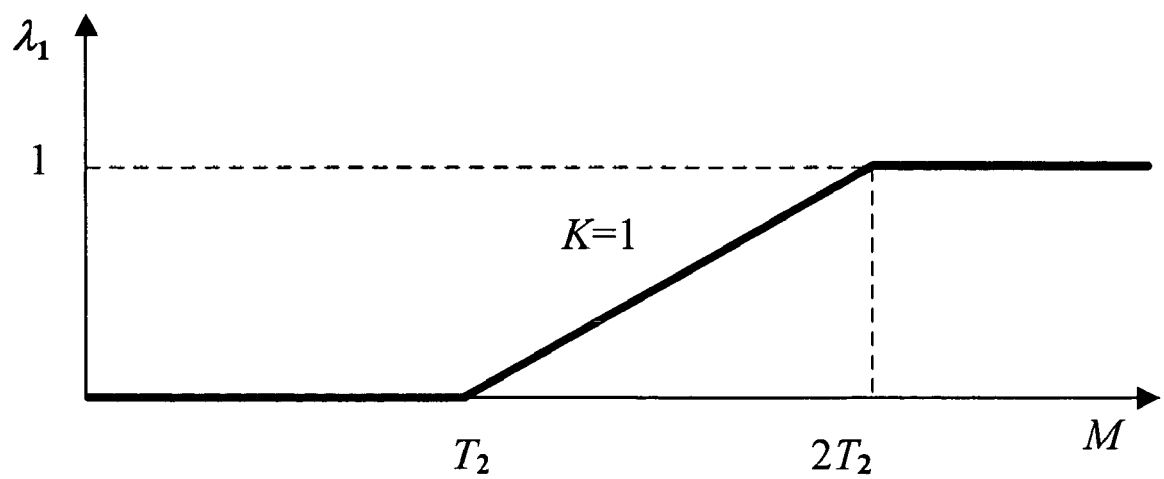
FIG. 9B shows a graphical illustration of a Gaussian Noise attenuation factor $\lambda_1$, according to one embodiment of the present invention.

FIG. 9B shows a graphical illustration of the smoothing coefficient $\lambda_1$ as a function of M for various values of $T_2$.

In FIG. 1, the output module 125 provides application of the nonlinear function $\Psi(\Delta)$, multiplied by the parameter $\gamma$ in module 130 and entered to a first input of the MPEG artifact reduction on/off switch 140 in FIG. 1. The second input of the switch 140 is a Local DC value with the reversed $-E_{DC}$. When switch 140 is in the 'on' position, MPEG artifact reduction mode is enabled. When switch 140 is in the 'off' position, MPEG artifact reduction mode is disabled. When the MPEG artifact reduction mode is enabled, the input value 134 to the output module 125 is $\gamma\Psi(\Delta)$, and when the MPEG artifact reduction mode is disabled, the input value is $-E_{DC}$.

Figure 10:
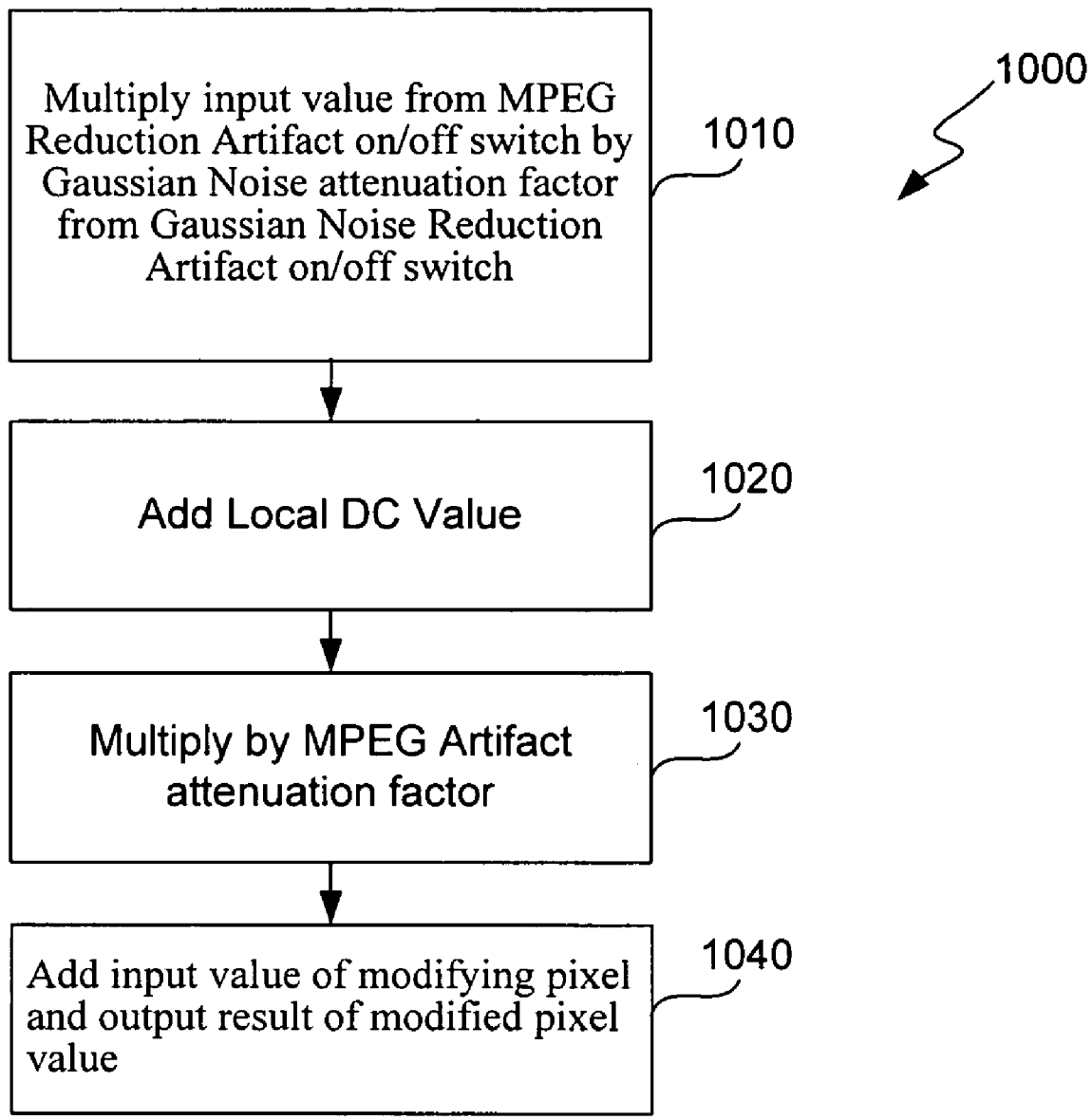
FIG. 10 shows a flow diagram of a method 1000 performed by output module 125, performed in accordance with one embodiment of the present invention.

FIG. 10 shows a flow diagram of a method 1000 performed by the output module 125 FIG. 1. In step 1010, the input value 134 from switch 140 is multiplied by input value 133, that is, the Gaussian Noise attenuation factor $\lambda_1$. In step 1020, the result is added to input signal 132, that is, the local DC value, to compute value 135. When both MPEG artifact reduction mode and Gaussian Noise reduction mode are enabled, the value 135 equals $$u' = \lambda_1 \gamma \Psi(\Delta) + E_{DC},$$

When MPEG artifact reduction mode is disabled and Gaussian Noise reduction mode is enabled, the value 135 equals $$u' = -\lambda_1 E_{DC} + E_{DC} = E_{DC}(1 - \lambda_1).$$

When both the MPEG Artifact Reduction mode and Gaussian Noise reduction mode are disabled, $\lambda_1 = 1$ and the value 135 equals $$u' = E_{DC}(1-1) = 0.$$

When MPEG artifact reduction mode is enabled, and the Gaussian Noise reduction mode is disabled, the value 135 equals $$u' = \gamma\Psi(\Delta) + E_{DC}.$$

In step 1030, the value 135 is multiplied by the MPEG artifact attenuation factor $\lambda$, that is, value 104, to control the applicability of the artifact reduction with respect to the dynamic range measure M. In step 1040, the result is added to the value of the input pixel e to compute the output modified pixel value ē. Therefore, $$\bar{e} = e + \lambda u'$$

Embodiments of the invention, including the apparatus disclosed herein, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

What is claimed is:

1. A method of reducing mosquito noise in an image frame of a video signal, the method comprising:
   examining a window of the image frame, the window including a plurality of pixel values;
   subtracting a selected one of the pixel values from the pixel values in the window to define a modified window of pixel value differences;
   computing a local mean value $E_{DC}$ of the pixel value differences in the modified window of pixel value differences;
   applying a highpass filter to the pixel value differences in the modified window of pixel value differences to generate a reducing value $E_{cb}$;
   computing a weighting coefficient $\alpha$ as a function of a variance of the pixel value differences in the modified window of pixel value differences;
   computing a weighted sum of the reducing value $E_{cb}$ and the local mean value $E_{DC}$ after multiplication with the weighting factor $\alpha$ to define a mosquito noise reduction value u according to the relation:

$$u = \alpha E_{cb} + (1-\alpha) E_{DC};$$

generating a nonlinear function $\Psi(u)$ of the difference between the mosquito noise reduction value u and the local mean value $E_{DC}$;
   computing an artifact attenuation factor $\lambda$ as a function of a dynamic range measure of the pixel value differences in the modified window of pixel value differences;
   adding the local mean value $E_{DC}$ to $\Psi(u)$;
   multiplying the artifact attenuation factor $\lambda$ by the sum of the local mean value $E_{DC}$ and $\Psi(u)$; and
   adding the selected one of the pixel values to the product of the artifact attenuation factor $\lambda$ and the sum of the local mean value $E_{DC}$ and $\Psi(u)$.

2. The method of claim 1 further comprising:
   limiting the pixel value differences in the modified window of pixel value differences by a threshold.

3. The method of claim 1, wherein computing the local mean value $E_{DC}$ includes:
   applying a 2D lowpass filter to the pixel value differences in the modified window of pixel value differences.

4. The method of claim 1, wherein:
   the selected pixel value is a central pixel of the window.

5. The method of claim 1, wherein:
   the window is a n×n window of pixels.

6. The method of claim 5, wherein:
   n is a small odd number.

7. The method of claim 6, wherein:
   n=3.

8. An apparatus for reducing mosquito noise in an image frame of a video signal, the apparatus comprising:
   a windowing module configured to examine a window of the image frame, the window including a plurality of pixel values;
   a subtraction module configured to subtract a selected one of the pixel values from the pixel values in the window to define a modified window of pixel value differences;
   a local mean determination module configured to compute a local mean value $E_{DC}$ of the pixel value differences in the modified window of pixel value differences;
   a mosquito noise reduction module configured to generate a mosquito noise reduction value u for the pixel value differences in the modified window of pixel value differences,
   wherein the mosquito noise reduction module includes:
      a highpass filter configured to generate a reducing value $E_{cb}$ when applied to the pixel value differences in the modified window of pixel value differences;
      a variance module configured to compute a weighting coefficient $\alpha$ as a function of a variance of the pixel value differences in the modified window of pixel value differences; and
      a summing module configured to compute a weighted sum of the reducing value $E_{cb}$ and the local mean value $E_{DC}$ to define the mosquito noise reduction value u according to the relation:

$$u = \alpha E_{cb} + (1-\alpha) E_{DC};$$

a nonlinear processing module configured to generate a nonlinear function $\psi(u)$ of the difference between the mosquito noise reduction value u and the local mean value $E_{DC}$;
   a smooth attenuation module configured to compute an artifact attenuation factor $\lambda$ as a function of a dynamic range measure of the pixel value differences in the modified window of pixel value differences; and an output module configured to:
add the local mean value $E_{DC}$ to $\psi(u)$;
multiply the artifact attenuation factor $\lambda$ by the sum of the local mean value $E_{DC}$ and $\psi(u)$; and
add the selected one of the pixel values to the product of the artifact attenuation factor $\lambda$ and the sum of the local mean value $E_{DC}$ and $\psi(u)$.

9. The apparatus of claim 8, wherein the mosquito noise reduction module includes:
a limiting module configured to limit the pixel value differences in the modified window of pixel value differences by a threshold.

10. A computer readable medium encoded with a computer software and when executed operable to:
subdivide an image frame of a video signal to generate a window of the image frame, the window including a plurality of pixel values;
subtract a selected one of the pixel values from the pixel values in the window to define a modified window of pixel value differences;
compute a local mean value $E_{DC}$ of the pixel value differences in the modified window of pixel value differences;
compute a mosquito noise reduction value u based on the pixel value differences, wherein computing the mosquito noise reduction value includes:
applying a highpass filter to the modified window of pixel value differences to generate a reducing value $E_{cb}$;
computing a weighting coefficient $\alpha$ as a function of a variance of the pixel value differences in the modified window of pixel value differences; and
computing a weighted sum of the reducing value $E_{cb}$ and the local mean value $E_{DC}$, after multiplication with the weighting factor $\alpha$, to define the mosquito noise reduction value u according to the relation:

$$u=\alpha E_{cb}+(1-\alpha)E_{DC};$$

generate a nonlinear function $\psi(u)$ of the difference between the mosquito noise reduction value u and the local mean value $E_{DC}$;
compute an artifact attenuation factor as a function of a dynamic range measure of the pixel value differences in the modified window of pixel value differences;
add the local mean value $E_{DC}$ to $\psi(u)$;
multiply the artifact attenuation factor by the sum of the local mean value $E_{DC}$ and $\psi(u)$; and
add the selected one of the pixel values to the product of the artifact attenuation factor and the sum of the local mean value $E_{DC}$ and $\psi(u)$.

11. The computer program product software of claim 10, further operable to:
limit the pixel value differences in the modified window of pixel value differences by a threshold.

12. The software of claim 10, wherein computing the local mean (DC) value includes:
applying a 2D lowpass filter to the pixel value differences in the modified window of pixel value differences.

13. The software of claim 10, wherein:
the selected pixel value is a central pixel of the window.

14. The software of claim 10, wherein:
the window is a n×n window of pixels.

15. The software of claim 14, wherein:
n is a small odd number.

16. The software of claim 15, wherein:
n=3.

* * * * *